(12) United States Patent
Cahill

(10) Patent No.: US 8,590,985 B2
(45) Date of Patent: Nov. 26, 2013

(54) METHOD TO DEGRADE BRAKING MODES

(75) Inventor: Eric D. Cahill, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 913 days.

(21) Appl. No.: 12/241,776

(22) Filed: Sep. 30, 2008

(65) Prior Publication Data

US 2010/0078519 A1 Apr. 1, 2010

(51) Int. Cl.
*B60T 8/88* (2006.01)

(52) U.S. Cl.
USPC .................................. 303/122.03; 188/166

(58) Field of Classification Search
USPC .......... 303/122, 122.03, 122.05, 122.08, 155, 303/166, 171–173
See application file for complete search history.

(56) References Cited

U.S. PATENT DOCUMENTS

| | | | |
|---|---|---|---|
| 4,656,588 A | 4/1987 | Kubo | |
| 5,795,039 A | 8/1998 | Fennel et al. | |
| 5,954,407 A * | 9/1999 | Schramm et al. | 303/155 |
| 6,256,570 B1 * | 7/2001 | Weiberle et al. | 701/70 |
| 6,292,733 B1 | 9/2001 | Sugiyama et al. | |
| 2004/0254711 A1 | 12/2004 | Zumberge et al. | |

FOREIGN PATENT DOCUMENTS

| | | |
|---|---|---|
| JP | 11020653 | 6/1997 |
| JP | 2004352150 | 5/2003 |

OTHER PUBLICATIONS

Diallo et al. "A Fault-Tolerant Control Architecture for Induction Motor Drives in Automotive Applications". Nov. 2004. IEEE Transactions on Vehicular Technology. vol. 53, No. 6. p. 1847-1855.*
"Design of the Reliable Control System with Multiple Sensors" Qing Zhao et al., Department of Electrical and Computer Engineering, 1999 IEEE.*
GB; Examination Report dated Feb. 20, 2012 Application No. GB0913118.6.
GB; Search Report dated Nov. 27, 2009 in Application No. GB0913118.6.

* cited by examiner

*Primary Examiner* — Anna Momper

(74) *Attorney, Agent, or Firm* — Snell & Wilmer, L.L.P.

(57) ABSTRACT

A system, apparatus and method of controlling a braking system of a vehicle having a plurality of rotating wheels and a plurality of brakes, each brake corresponding to one of the plurality of wheels, is provided. In controlling the brakes, an operational status of the braking system is determined. Based on the determined operational status, different feedback regulation schemes are selectively implemented to control the brake force applied by the brakes.

16 Claims, 5 Drawing Sheets

METHOD TO DEGRADE BRAKING MODES

FIELD OF THE INVENTION

The present invention relates generally to brakes and, more particularly, to a method, apparatus, and system for providing brake control during failure of one or more brake components.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

To control operation of the brake system, a brake system control unit (BSCU) is typically employed, wherein the BSCU is operatively coupled to the brake system so as to provide control signals thereto. The BSCU typically includes a microprocessor that executes a control algorithm which, based on a target brake force (e.g., as provided by a brake pedal) and actual brake data (e.g., as provided by sensors at the wheels and/or brakes), commands the actuator rams to vary an applied force so as to achieve the target brake force. In addition, the BSCU may implement anti-skid control to prevent any of the wheels from skidding, which is undesirable.

SUMMARY OF THE INVENTION

A system, apparatus and method in accordance with the present invention enables a feedback regulation scheme (also referred to as control strategy or control mode) for controlling brakes of a vehicle, such as an aircraft, to be changed based on an operational status of the brake system. More specifically, the feedback regulation scheme is selected based on certain events, such as malfunction of system components, for example. The selection process may include several steps of degradation, the steps depending on the specific event.

For example, in a brake system that includes a plurality of brakes and a plurality of corresponding wheels, a first feedback regulation scheme, such as deceleration braking control, may be implemented for all brake/wheel combinations during normal operation of the brake system (i.e., while a malfunction has not occurred in the brake system). Should a malfunction be detected, such as, for example, a failure of one or more wheel speed sensors, then the feedback regulation scheme is degraded to a second feedback regulation scheme, such as force braking control (or pressure braking control). Preferably, upon degrading from the first feedback regulation scheme to the second feedback regulation scheme the control for all brake/wheel combinations is degraded, even if only a single wheel/brake combination experiences a malfunction. Should another malfunction be detected, such as, for example, a failure of a force sensor of one brake, then the feedback regulation scheme can be further degraded to a third feedback regulation scheme, such as open-loop braking control. Preferably, degradation to the third feedback regulation scheme is performed on brake-by-brake basis (e.g., only on the brakes that have a malfunctioning force sensor), and not on all brake/wheel combinations.

According to one aspect of the invention, there is provided a system, apparatus and method for braking a vehicle having a plurality of rotating wheels and a plurality of brakes, wherein each brake corresponds to one wheel of the plurality of wheels. More specifically, the system, apparatus and method selectively implement one of a plurality of different feedback regulation schemes based on an operational status of the braking system.

In a preferred embodiment, feedback regulation schemes include deceleration braking control, force braking control, and open-loop braking control. The braking system also can include a plurality of wheel speed sensors, each sensor corresponding to one of the plurality of wheels. Deceleration braking control can be implemented when the operational status of each wheel speed sensor is determined to be normal, and force braking control can be implemented when the operational status of at least one wheel speed sensor is malfunctioning. Preferably, when deceleration braking control is implemented, it is implemented for all brakes. Similarly, when force braking control is implemented, it is also preferable to implement such control for all brakes.

In another preferred embodiment, the braking system also includes a plurality of force sensors corresponding to each wheel and/or to each actuator, the force sensors each providing data indicative of a braking force or pressure applied by the brake system. Open-loop braking control can be implemented when the operational status of at least one force sensor is malfunctioning. Preferably, open-loop braking control is implemented only on brakes that have a malfunctioning force sensor.

Also, it is preferable to maintain anti-skid brake operation for wheels having functional wheel speed sensors.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

DETAILED DESCRIPTION

As used herein, the term "feedback regulation scheme" refers to the type of control or "control loop" utilized to command a braking force. For example, in a feedback regulation scheme that implements force control, the actual force applied by brake actuators (e.g., as measured by force sensors) may be used to close a control loop that regulates the commanded braking force (e.g., by generating a braking force command based on a reference force and a feedback force). Another example is deceleration control, wherein vehicle velocity (e.g., as measured by wheel speed sensors) is used to close the control loop to regulate a deceleration rate of the vehicle (e.g., by generating a braking force command based on a reference vehicle deceleration rate and an actual vehicle deceleration rate). Also, the term "feedback regulation scheme" includes control or control loops that do not implement feedback (e.g., open-loop control).

The principles of the invention will now be described with reference to the drawings. Because the invention was conceived and developed for use in an aircraft braking system, it will be herein described chiefly in this context. However, the principles of the invention in their broader aspects can be adapted to other types of systems. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

Figure 1A:
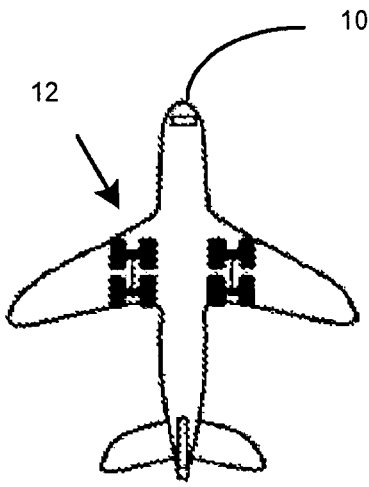
FIGS. 1A-1B are schematic diagrams illustrating, respectively, an exemplary aircraft having bogie landing gear, and a landing gear of the aircraft.

Referring now in detail to the drawing, FIG. 1A is schematic diagram illustrating an exemplary aircraft 10 having bogie landing gear 12. As is evident, the exemplary bogie landing gear configuration 12 includes eight main wheels. As will be appreciated by those having ordinary skill in the art, other configurations are possible, e.g., six-wheel bogie gears, two wheels on a "twin" gear, etc.

Figure 1B:
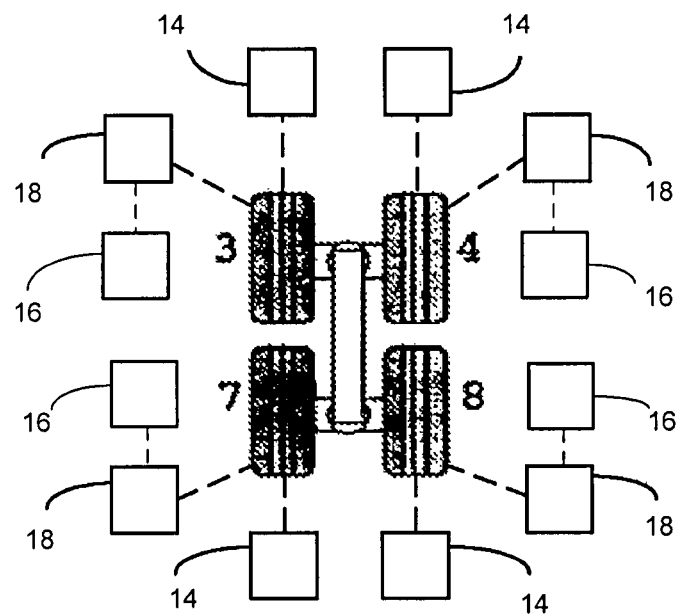

With further reference to FIG. 1B, each wheel/brake/sensor combination on the exemplary landing gear 12 includes a wheel speed sensor 14, force sensor 16, and brake 18. Each wheel speed sensor 14 may be a single channel sensor, although multi-channel sensors may be used to mitigate the potential loss of a speed signal. The wheel speed sensor 14 and the force sensor 16 may be any conventional sensors used to measure wheel speed and force, respectively. Further, data provided by the respective sensors may be analog data or digital data, for example.

The brake 18 for each wheel may be an electrically operated brake, a hydraulically operated brake, a pneumatically operated brake, etc. In the following, the principles of the invention are described with respect to an electrically operated brake system. It is noted however, that illustration of such electrically operated brake system is merely exemplary.

Figure 2:
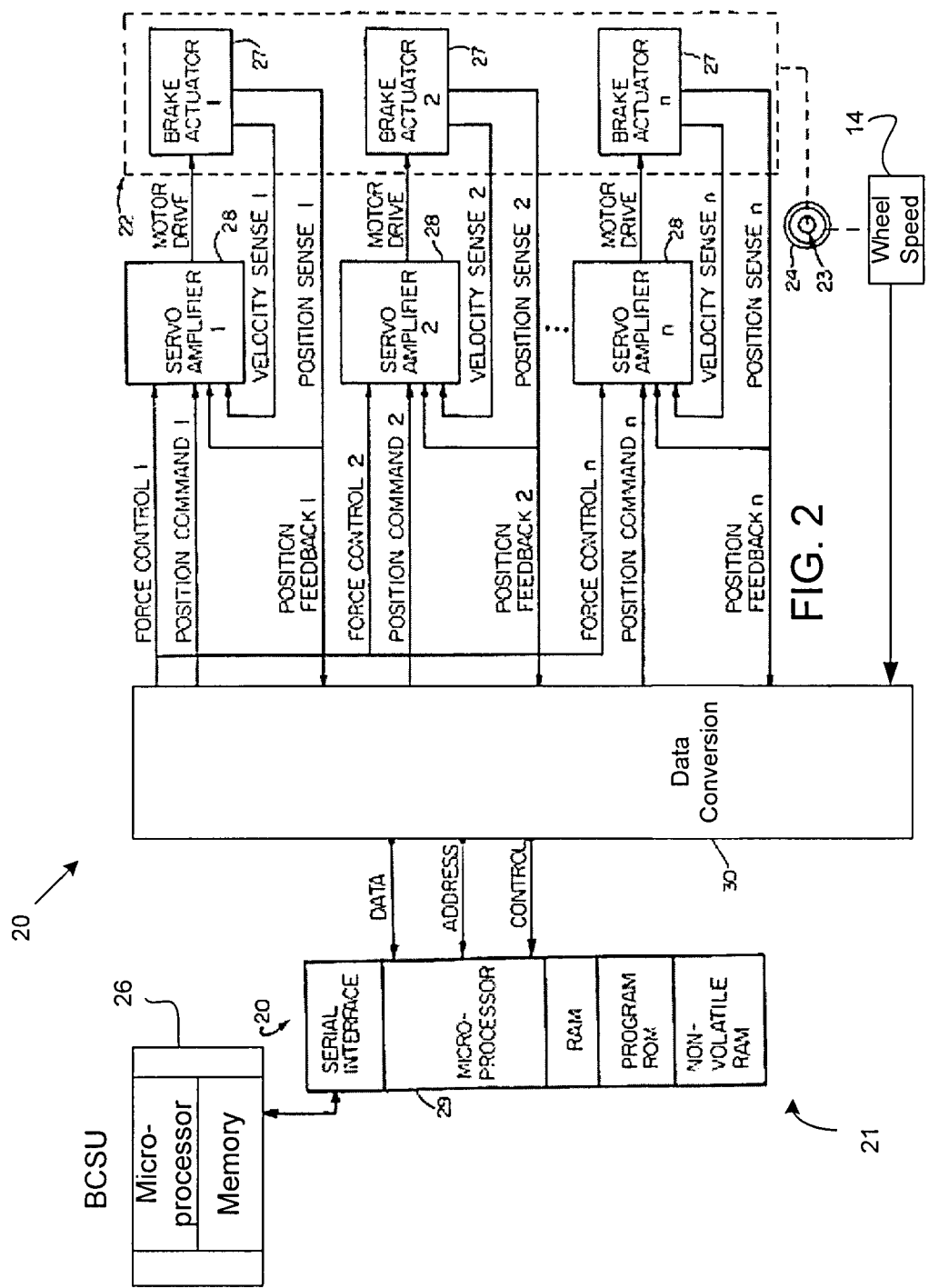
FIG. 2 is a diagrammatic illustration of an exemplary multi-actuator computer controlled brake actuation system.

FIG. 2 diagrammatically illustrates an exemplary multi-actuator computer controlled electrical brake actuation system 20 to which the principles of the invention may be applied. The major functions of the system 20 are performed by a controller 21 and a brake actuator assembly 22. The brake actuator assembly 22 may be mounted in a conventional manner on a wheel and brake assembly 23 to apply and release braking force on a rotatable wheel 24 of such wheel and brake assembly. Wheel speed data is provided to the controller 21 via a wheel speed sensor 25 coupled to each wheel 24.

In the illustrated exemplary system 20, the brake actuator assembly 22 includes at least one and preferably a plurality of actuators, such as electro-mechanical actuators (EMAs) 27. The controller 21 includes a corresponding number of independent servo amplifiers 28, a micro-processor 29 with associated peripherals, and a data input/output (I/O) circuitry 30. As depicted, plural (for example, four) independent, linear electro-mechanical servo loops operate in a position mode, i.e., the linear position of each actuator is a function of an analog input voltage (or digital equivalent for a digital signal processor) applied to a position command input.

Figure 3:
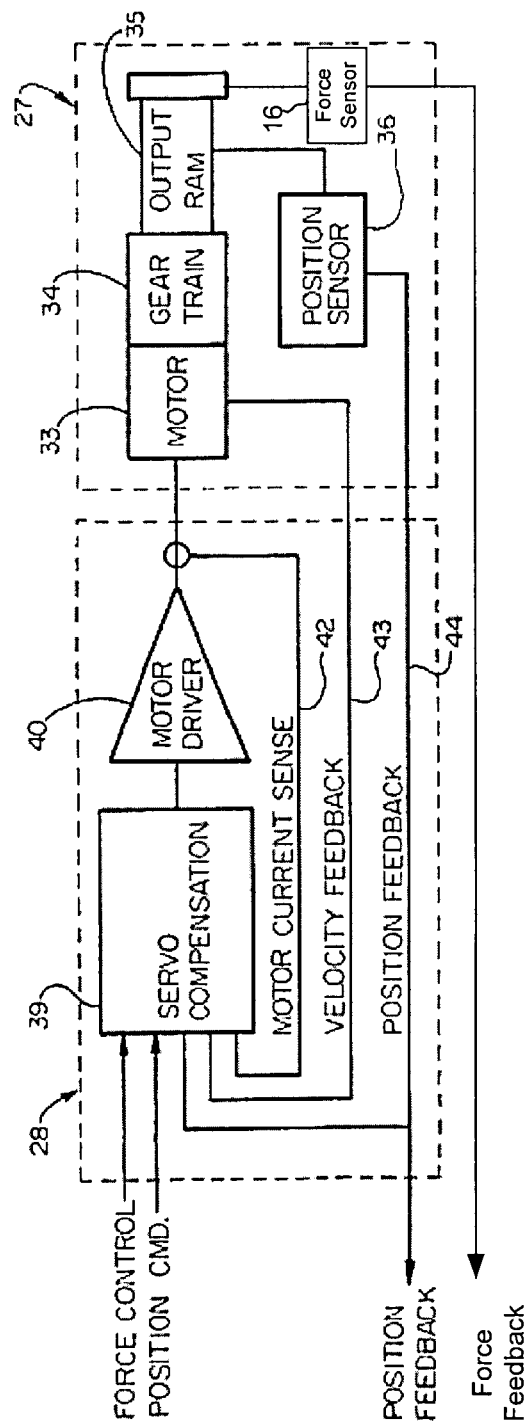
FIG. 3 is a diagrammatic illustration of a brake actuator and associated servo amplifier employed in the system of FIG. 2.

In FIG. 3, a representative electro-mechanical brake actuator 27 and associated servo amplifier 28 are illustrated in greater detail. The brake actuator 27 includes an electric servo motor 33, gear train 34, and a reciprocating output ram 35. The brake actuator has associated therewith an output ram position sensor 36 which provides for actuator position feedback as depicted, and a force sensor 16 that provides data indicative of a force applied by the brake actuator on the brake-disk stack. Although not shown, the brake actuator 27 also has associated therewith a motor tachometer to provide for velocity feedback.

The servo amplifier 28 includes servo loop compensation networks and amplifiers 39, and a DC motor driver 40 with associated control logic and current control circuitry. More particularly, the position servo amplifier 28 may include an inner motor current control servo loop 42, an intermediate motor velocity servo loop 43, and a ram position servo loop 44. Each loop may be compensated to obtain desired performance in terms of bandwidth, and to provide for uniform dynamic response of all brake actuators 27. In addition, the servo amplifier 28 includes means for controlling motor current and therefore the output force of the brake actuator in response to a force control input. The force control input may be an analog input signal that controls motor current level while the aforesaid position command input controls actuator displacement. As will be appreciated, the analog input signals may be replaced by digital input signals if a digital signal processor is used in the servo amplifier for actuator control.

As noted above, the brake actuator 27 may include a force sensor 16 to provide data indicative of a force applied by the brake actuator. Alternatively, or in conjunction with the force sensor 16, the actual current delivered to each motor and/or ram position (as determined from the ram position sensor 36) may be used as an indicator of the actual force applied by the brake actuator 27. Such force data can be provided to the controller 21 to implement brake control algorithms, as discussed in more detail below.

As indicated, the displacement of each actuator 27 is controlled by the electronic controller 21 (FIG. 2). The microprocessor 29 of the controller provides brake control algorithm processing, temporary data storage in RAM, program memory storage, non-volatile data storage, and control of the servo amplifiers 28 via the input/output circuitry 30. The input/output circuitry 30 provides for digital-to-analog data conversion, generating the analog position commands and the analog motor current control commands to the four actuators, analog-to-digital data conversion to monitor the actuator position sense and motor current feedback signals, and signal discretes for auxiliary functions such as motor brake control. The micro-processor may also be interfaced via a serial communication link with other control components as needed, such as, for example, a brake system control unit (BSCU) 26, which also includes a separate microprocessor and memory, and may have supervisory control over a number of brake controllers 21. Although micro-processors are utilized in the illustrated preferred embodiment, processing could be done analog as opposed to digital, or intermixed with digital processing as may be desired.

In the illustrated system, the four servo amplifiers 28 (FIG. 3) are independent and functionally identical, each amplifier being controlled by the micro-processor 29, responding to the position commands and motor current control signals from the processor, and feeding back the actuator position and motor current sense signals to the processor via the I/O circuitry 30.

The controller may use two separate power sources: for example, a 28 VDC supply to power the low level electronic circuitry and 28 to 270 VDC supply to power the four actuator motors through the motor driver power stage. The 28 VDC actuator power may be utilized in emergency situations when 270 VDC is not available due to power system fault.

Figure 4:
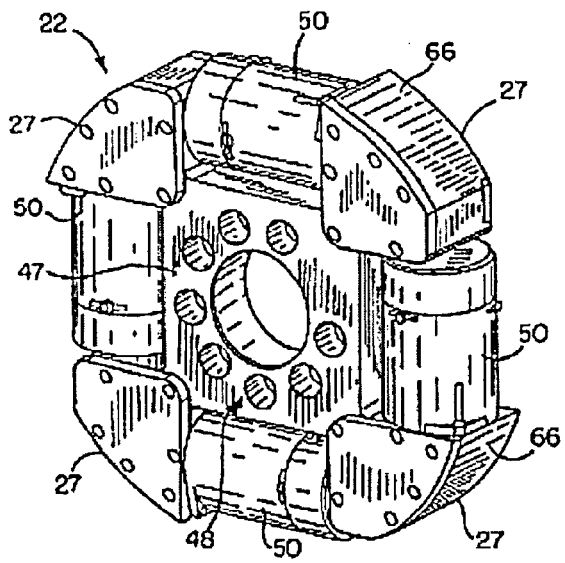
FIG. 4 is a perspective view of an exemplary brake housing and actuator assembly useful in the system of FIG. 2.
Figure 5:
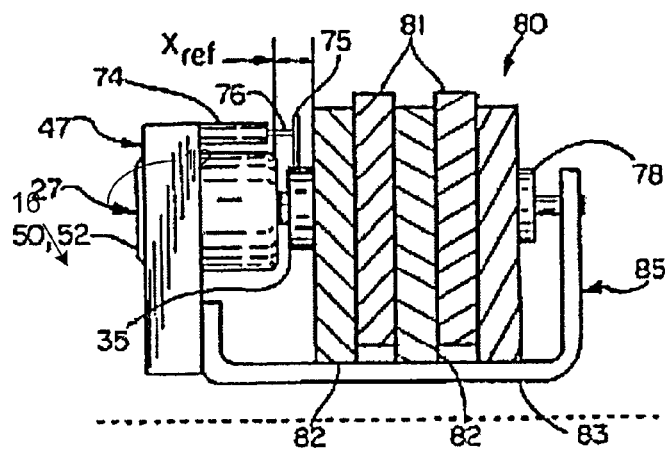
FIG. 5 is a schematic view showing a brake actuator assembly in relation to a brake disk stack.

Further details of an exemplary brake actuator assembly 22 are shown in FIGS. 3-4. The brake actuator assembly includes a housing 47 that provides for the mounting of an electro-mechanical actuator 27, it being understood that typically multiple actuators will be mounted to the housing, such as four functionally identical actuators located at respective quadrants of the housing. The illustrated housing has a bolt circle 48 for mounting to the overall wheel and brake assembly 23 (FIG. 1). Each actuator 27 may include a DC brushless servo motor 50 and suitable reduction gearing 52 that translates rotary motor motion to linear motion of the ram 35 (the rams are hidden from view in FIG. 3). The brushless DC servo motor 50 may have integrated or otherwise associated therewith a friction type, fail-safe (power-off engaged) brake (not separately shown), and a resolver (not separately shown) for motor rotor commutation and angular velocity sensing. The resolver provides motor position feedback and velocity information. In particular, the resolver provides an electrical signal that is proportional to motor shaft position.

The ram 35 of each actuator is mechanically connected to an LVDT position sensor 74, such as by bracket 75. The LVDT armature 76 may be adjustably attached to the bracket (or the sensor body to the brake housing) by suitable means that provides for LVDT setting and position calibration. A cover (not shown), or the like, may be provided to protect for the LVDT mounting mechanism. Although an LVDT sensor is preferred, other types of position sensors/transducers may be used as desired for a particular application.

The purpose of the brake actuator(s) 27 is to impress a clamping force on the stack 80 of brake disk elements. The electro-mechanical (EM) actuator(s) operate simultaneously to produce a clamping force between a brake reaction plate 78 and the actuator output rams 35. An exemplary system utilizes four actuators, operating simultaneously, to provide the total brake clamping force required. However, the size and number of actuators may be varied to provide the total brake clamping force required. The actuators may be operated in a controlled displacement mode such that the clamping force is proportional to the deflection of the reaction plate. Although each actuator can operate independently, the actuators may be commanded in pairs (or otherwise), the actuators of each pair being located physically on diametrically opposite sides on the brake housing.

The brake disk stack 80 includes alternating rotor disks 81 and stator disks 82 mounted with respect to a torque tube 83 or similar member and the wheel for relative axial movement. Each rotor disk 81 is coupled to the wheel for rotation therewith and each stator disk 82 is coupled to the torque tube 83 against rotation. A back plate 85 is located at the rear end of the brake disk stack and functions as a force reaction member via the reaction plate 78. The brake actuator 27 is mounted to brake housing 47 fixed with respect to the torque tube. The ram 35 of the actuator extends to compress the brake disk stack 80 against the back plate 85, and torque is taken out by the stator disks 82 through the static torque tube 83 (or the like).

Figure 6:
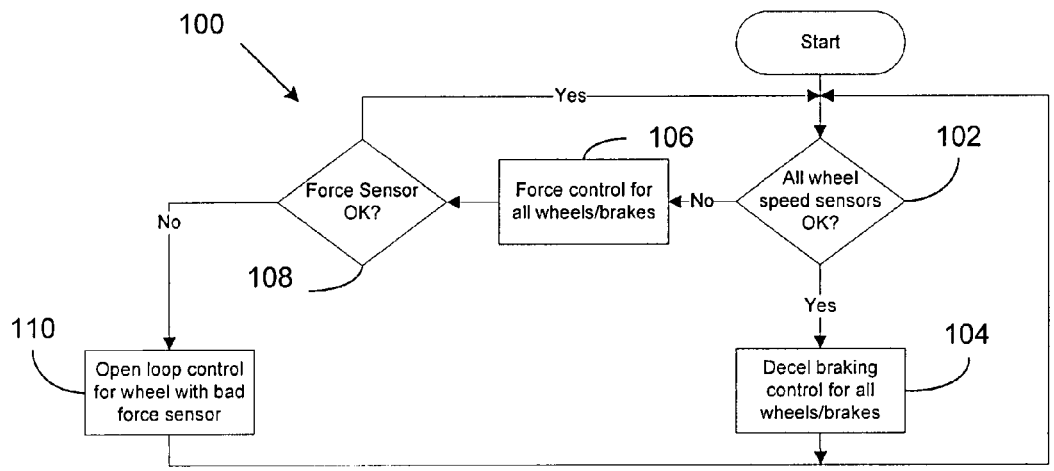
FIG. 6 is a flowchart illustrating an exemplary brake degradation control scheme in accordance with the invention.

The BSCU 26 and/or controller 21 (FIG. 2) is suitably programmed to carry out a brake degradation routine in accordance with the invention. FIG. 6 illustrates a preferred embodiment of the brake degradation routine 100, wherein the feedback regulation scheme is based on the status of wheel speed sensors 14 and force feedback sensors 16. It is noted, however, that the brake degradation routine may monitor other parameters, and reference to the wheel speed sensors and force sensors is merely exemplary.

Beginning at block 102 of FIG. 6, it is determined if the wheel speed sensors 14 are functional or malfunctioning. The term "malfunctioning" as used herein refers to abnormal, faulty and/or non-functional operation of a device, such as a sensor. A malfunctioning sensor, for example, may not output any data, or it may have sufficient operational capability to output data (even valid data). However, due to some issue with the sensor, the data is not output, incorrect and/or cannot be relied upon for accuracy. The term "functional" as used herein refers to normal operation of a device.

If all of the wheel speed sensors 25 are determined to be functional, then at block 104 a first feedback regulation scheme, e.g., deceleration braking control, is implemented by the BSCU 26 and/or the controller 21 for all brakes. In deceleration braking control, the braking force applied by each brake actuator 27 is varied so as to regulate a deceleration rate of the corresponding wheel 24 (the deceleration rate of each wheel 24 can be derived from its wheel speed sensor 14). For example, if, in deceleration braking control, the brakes are applied and the target deceleration rate is 10 feet per second per second (FPS/Sec$^2$) and the actual deceleration for a particular wheel is 9 FPS/Sec$^2$, the BSCU 26 and/or controller 21 commands the actuator 27 corresponding to that wheel to increase the applied braking force so as to increase the wheel's deceleration rate. Conversely, if the actual deceleration rate of a wheel is 11 FPS/Sec$^2$, then the BSCU 26 and/or controller 21 commands the actuator 27 corresponding to that wheel 24 to decrease the braking force for that wheel to decrease the wheel's deceleration rate.

Moving back to block 102, if it is determined that at least one wheel speed sensor 14 is malfunctioning, then at block 106 the BSCU 26 and/or controller 21 degrades control of all brakes to a second feedback regulation scheme, e.g., force braking control. In force braking control, the braking force applied by each brake actuator 27 is regulated to a target value as determined, for example, by the amount of brake pedal deflection. For example, if the brake pedal is depressed to 50 percent of maximum deflection, then the target brake force (i.e., the desired brake force) may be said to be 50 percent of the maximum force. The BSCU 26 and/or controller 21 then will command the actuator 27 to vary the applied force such that the actual braking force (as measured by the force sensor 16 corresponding to the actuator) equals the target brake force. If the target brake force is 50 percent and the actual brake force is 40 percent, the BSCU 26 and/or controller 21 will command the actuator 27 to increase the applied force. Similarly, if the target brake force is 50 percent and the actual force is 60 percent, then the BSCU 26 and/or controller 21 will command the actuator 27 to decrease the applied force.

Next at block 108, the force sensor 16 for each brake actuator 27 is monitored to determine if it is functional or malfunctioning. If the force sensor 16 is functional, then the method moves back to block 102 and repeats. However, if a force sensor is malfunctioning, then at block 110 the control for the brake corresponding to the malfunctioning force sensor is degraded to a third feedback regulation scheme, e.g., open-loop brake control. In open-loop brake control the BSCU 26 and/or controller 21 outputs a commanded force to the brake actuator 27 and assumes that the commanded force is roughly achieved. In other words, a feedback signal is not employed in open-loop braking control. The control for the remaining brakes preferably remains in force braking control.

Figure 7:
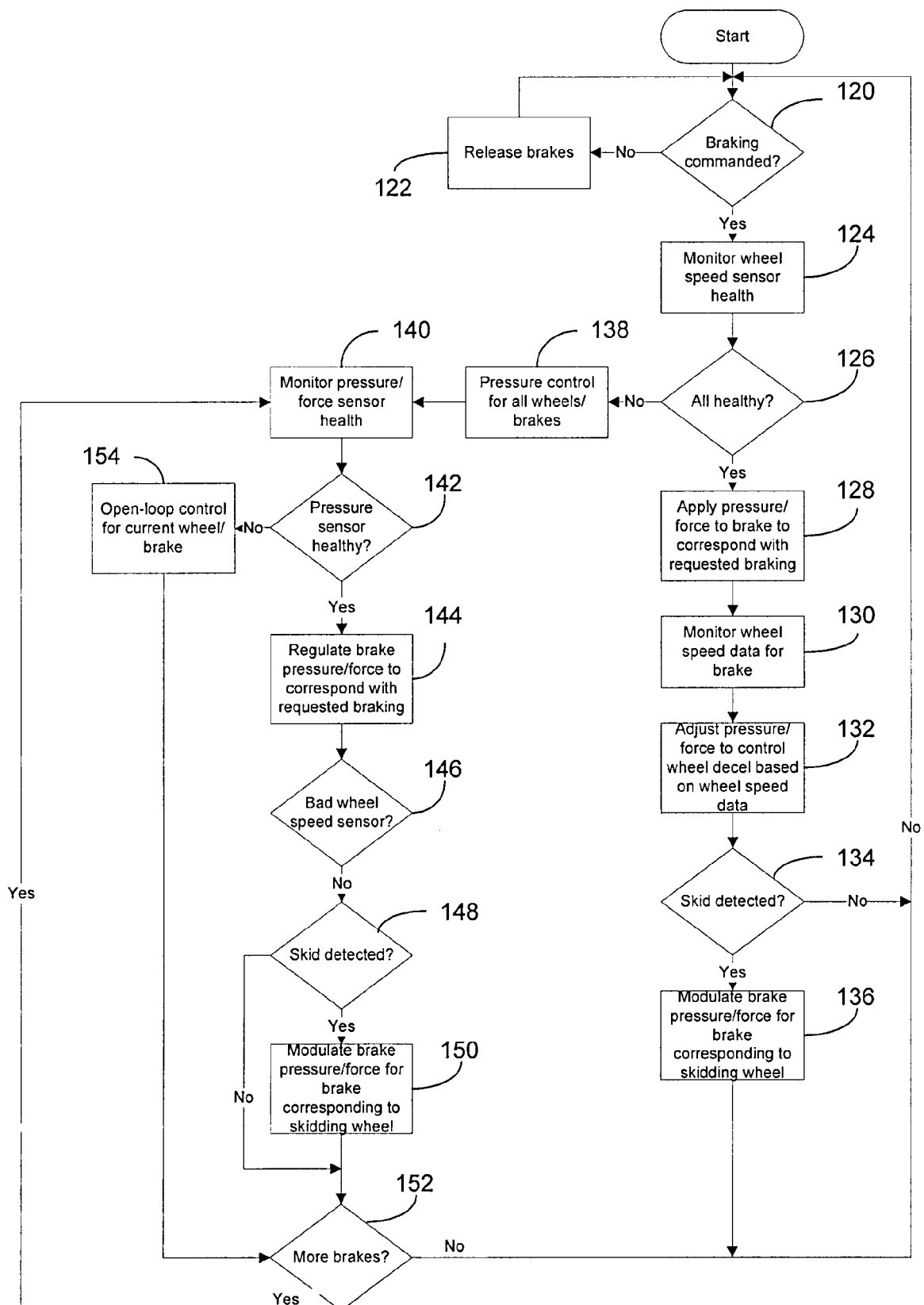
FIG. 7 is a flowchart illustrating a method of implementing an exemplary brake degradation control in accordance with the invention.

FIG. 7 illustrates the exemplary brake degradation routine in more detail. Beginning at block 120, it is determined if a braking command has been requested. For example, if the vehicle's brake pedal is being depressed then it can be concluded that a braking command is requested. Detection of the brake pedal movement, for example, may be by way of monitoring a signal provided by the brake pedal (e.g., a brake deflection signal) and comparing that signal to a predetermined threshold. If the signal exceeds the threshold, then it can be concluded that a brake pedal is depressed (and thus braking is commanded). If braking is not commanded, then at block 122 the brakes are released and the method moves back to block 120. However, if braking is commanded, then at block 124 the operational status of all wheel speed sensors 14 is monitored. For example, the wheel speed sensors may provide a signal (e.g., contact closure) to the BSCU 26 and/or controller 21, wherein the signal is indicative of the sensor's operational status. The BSCU 26 and/or controller 21 then can determine the operational status of the sensor from the signal. Alternatively, the lack of a signal, or a signal that does not include a specific pattern of information, also may be used to determine the sensor's operational status.

At block 126, if the operational status of all wheel speed sensors 14 is functional, then the method moves to block 128, wherein the BSCU 26 and/or controller 21 implements a first feedback regulation scheme, such as deceleration braking control. In deceleration braking control, the BSCU 26 and/or controller 21 command the actuators 27 for each brake to apply a force corresponding to an initial braking force. More specifically, the BSCU 26 and/or controller 21 may have a target deceleration rate for each wheel. Based on that target deceleration rate, the BSCU 26 and/or controller 21 command the actuators 27 to apply an initial braking force in an attempt to achieve the target deceleration rate. At block 130, the BSCU 26 and/or controller 21 monitor the wheel speed data for each wheel and determine if the actual deceleration rate satisfies the target deceleration rate. Then at block 132, the BSCU 26 and/or controller 21, if necessary, command the actuators 27 for the respective wheels to alter the braking force so as to achieve the target deceleration rate.

At block 134, anti-skid functionality is implemented. More specifically, it is determined whether any of the wheels are experiencing a skid condition. Such determination can be made, for example, by comparing wheel speed data as collected by the respective wheel speed sensors 14. If the wheel speed for a particular wheel is significantly lower than the wheel speed for other wheels, then it can be concluded that the wheel with the lower wheel speed is in a skid condition. If the detected wheel speed for all wheels is in general agreement (e.g., within 5 percent of one another), then it can be concluded that none of the wheels are in a skid condition.

If wheel skid is not detected, then the method moves back to block 120. However, if a wheel skid is detected, then at block 136 the BSCU 26 and/or controller 21 commands the actuator(s) 27 corresponding to the skidding wheel to modulate the applied brake force in an attempt to stop the skid. The method then moves back to block 120 and repeats.

Moving back to block 126, if all of the wheel speed sensors 14 are not functional (e.g., at least one wheel speed sensor is malfunctioning), then the method moves to block 138 wherein the BSCU 26 and/or controller 21 degrades the feedback regulation scheme to a second feedback regulation scheme, e.g., force control. Preferably, the degradation from the first feedback regulation scheme (e.g., deceleration control) to the second feedback regulation scheme (e.g., force control) is done to all brakes so as to assure that there is not a mix of control strategies, which could result in undesirable side effects across multi-wheeled/braked vehicles. However, in certain configurations, it may be desirable in a single-fault condition (e.g., only a single wheel speed sensor failure) to remain in the first feedback regulation scheme (e.g., deceleration control) and have no braking at one position. Should a second wheel speed sensor fail, then control can be degraded to the second feedback regulation scheme (e.g., force control) across all brakes.

Next at blocks 140 and 142 the operational status of the force sensors 16 for each brake is monitored. Monitoring of each force sensor's operational status may be done in a manner similar to that described with respect to the wheel speed sensors 14. If the force sensor 16 for a particular brake is functional, then at block 144 the BSCU 26 and/or controller 21 controls the actuator 27 so as to regulate the braking force applied by that actuator (e.g., to achieve a desired or target force). Next at block 146, it is determined if the wheel speed sensor 14 corresponding to the present force sensor 16 is operational. If the wheel speed sensor is malfunctioning, then the method moves block 152. However, if the wheel speed sensor is functional, then the method moves to block 148 and 150 and performs anti-skid functionality as described with respect to blocks 134 and 136. Preferably, anti-skid brake operation is maintained for wheels having functional wheel speed sensors. Upon completing the anti-skid functionality, it is determined at block 152 if all of the force sensors 16 have been checked. If all force sensors have been checked, then the method moves back to block 120 and repeats, otherwise the method moves back to block 140 and repeats.

Moving back to block 142, if the force sensor 16 is determined to be malfunctioning, then the method moves to block 154 and the BSCU 26 and/or controller 21 degrades the feedback regulation scheme to the third feedback regulation scheme (e.g., open-loop control) for the brake(s) corresponding to the faulty force sensor. The control for brakes with functional force sensors is maintained under force control. The method then moves back to block 120 and repeats.

While degradation of the feedback regulation scheme has been described as proceeding from a) deceleration control to b) force control and then to c) open-loop control, other progressions are possible. For example, instead of deceleration control, the first feedback regulation scheme may implement force control. Then, if a force sensor fails for one or more brakes, the feedback regulation scheme may degrade to deceleration control. As will be appreciated, other progressions are possible.

Accordingly, a brake controller, system, and method is provided that upon malfunction of a brake system component, changes the feedback regulation scheme implemented by the brake controller. This enables the brakes to be operated in an optimal manner during failure of one or more system components.

A person having ordinary skill in the art of computer programming and applications of programming for computer systems would be able in view of the description provided herein to program the BSCU 12 to operate and to carry out the functions described herein. Accordingly, details as to the specific programming code have been omitted for the sake of brevity. Also, while software in the memory 12*b* or in some other memory of the BSCU 12 may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A brake system for applying a braking force to a plurality of rotatable wheels of a vehicle, comprising:
    a plurality of brakes, each brake associated with a corresponding one of the plurality of wheels and operative to provide a braking force thereto; and
    a controller configured to selectively implement a feedback regulation scheme to regulate the braking force applied to the wheels,
    wherein the feedback regulation scheme is selected based on an operational status of at least one wheel speed sensor in a plurality of wheel speed sensors,
    wherein the controller receives wheel speed data from the at least one wheel speed sensor,
    wherein the at least one wheel speed sensor is associated with one of the plurality of wheels,
    wherein the feedback regulation scheme comprises at least one of deceleration braking control, force braking control, pressure braking control, and open control,
    wherein the controller selects deceleration braking control, as the feedback regulation scheme based upon at least one of presence of the wheel speed data and a reliability of the wheel speed data.

2. The brake system according to claim 1, wherein each wheel speed sensor is operatively coupled to a corresponding one of the plurality of wheels and to the controller, each respective sensor operative to provide data indicative of wheel speed, wherein the controller is configured to:
    monitor an operational status of each wheel speed sensor,
    select force braking control as the feedback regulation scheme in response to at least one of loss of the wheel speed data and loss of reliability of the wheel speed data.

3. The brake system according to claim 2, wherein in response to the controller implementing deceleration braking control as the feedback regulation scheme, the controller is configured to use deceleration braking control for each of the plurality of brakes.

4. The brake system according to claim 2, wherein in response to the controller implements force braking control as the feedback regulation scheme, the controller is configured to use force braking control for each of the plurality of brakes.

5. The brake system according to claim 1, wherein each of the plurality of brakes includes a corresponding actuator, further comprising a plurality of force sensors, each force sensor operatively coupled to a corresponding one of the actuators and to the controller, each respective force sensor operative to provide data indicative of a force applied by the corresponding actuator, wherein the controller is configured to:
    receive data indicative of the fore applied by the corresponding actuator, and
    select open-loop control as the feedback regulation scheme in response to at least one of loss of the data indicative of a force applied by the corresponding actuator and loss of reliability of the data indicative of a force applied by the corresponding actuator.

6. The brake system according to claim 5, wherein in response to the controller selecting open-loop control as the feedback regulation scheme, the controller is configured to implement open-loop control only on brakes that have a malfunctioning force sensor.

7. The brake system according to claim 6, wherein the controller is configured to implement anti-skid brake operation for wheels having functional wheel speed sensors.

8. A method of controlling a braking system of a vehicle having a plurality of rotating wheels, and a plurality of wheel speed sensors, wherein each sensor corresponds to one of the plurality of rotating wheels and is operative to provide wheel speed data, and a plurality of brakes, each brake corresponding to one of the plurality of wheels, comprising:
    determining an operational status of at least one of the plurality of wheel speed sensors;
    receiving wheel speed data from at least one wheel speed sensor in the plurality of wheel speed sensors,
    selectively implementing a feedback regulation scheme wherein the feedback regulation scheme comprises at least one of deceleration braking control, force braking control, pressure braking control, and open control; and selecting deceleration braking control as the feedback regulation scheme based upon at least one of presence of the wheel speed data and a reliability of the wheel speed data.

9. The method according to claim 8, further comprising selecting force braking control as the feedback regulation scheme in response to at least one of loss of the wheel speed data and loss of reliability of the wheel speed data.

10. The method according to claim 8, wherein the braking system further includes a plurality of three sensors, each force sensor operatively coupled to a corresponding one of the actuators and to the controller, each respective force sensor operative to provide data indicative of a force applied by the corresponding actuator, the method further comprising selecting deceleration braking control as the feedback regulation scheme in response to at least one of loss of the data indicative of a force applied by the corresponding actuator and loss of reliability of the data indicative of a force applied by the corresponding actuator.

11. A brake controller for controlling a braking force applied by a plurality brakes to a plurality of rotatable wheels of a vehicle, wherein each brake is associated with a corresponding one of the plurality of wheels, wherein the brake controller is configured to communicate with a plurality of wheel speed sensors, each sensor corresponding to one of a plurality of wheels and operative to provide data indicative of wheel speed of the corresponding wheel, the brake controller comprising:

a processor and memory; and logic stored in memory and executable by the processor, the logic including logic configured to receive wheel speed data from at least one wheel speed sensor in the plurality of wheel speed sensors, logic configured to selectively implement a feedback regulation scheme based on the determination, wherein the feedback regulation scheme comprises at least one of deceleration braking control, force braking control, pressure braking control, and open control;

logic configured to select deceleration braking control as the feedback regulation scheme based upon at lease one of presence of the wheel speed data and a reliability of the wheel speed data.

12. The controller according to claim 11, the controller further comprising:

logic configured to select force braking control logic as the feedback regulation scheme in response to in response to at least one of loss of the wheel speed data and loss of reliability of the wheel speed data.

13. The controller according to claim 12, wherein the logic configured to select deceleration braking control includes logic configured to implement deceleration braking control to control the brake force applied by each of the plurality of brakes.

14. The controller according to claim 12, wherein the logic configured to select force braking control includes logic configured to implement three braking control to control the brake force applied by each of the plurality of brakes.

15. The controller according to claim 11, wherein the controller is configured to communicate with a plurality of force sensors, each force sensor associated with a corresponding one of a plurality of brake actuators and operative to provide data indicative of a force applied by the corresponding actuator, the controller further comprising:

logic configured to select open-loop braking control in response to in response to at least one of loss of the data indicative of a force applied by the corresponding actuator and loss of reliability of the data indicative of a force applied by the corresponding actuator.

16. The controller according to claim 15, wherein the logic configured to select open-loop braking control includes logic configured to implement open-loop braking control only on brakes that have a malfunctioning force sensor.

\* \* \* \* \*

UNITED STATES PATENT AND TRADEMARK OFFICE
CERTIFICATE OF CORRECTION

PATENT NO. : 8,590,985 B2  Page 1 of 1
APPLICATION NO. : 12/241776
DATED : November 26, 2013
INVENTOR(S) : Eric D. Cahill It is certified that error appears in the above-identified patent and that said Letters Patent is hereby corrected as shown below:

In the Claims:

In Column 10 Line 37, please delete "fore" and insert therefor --force--.

In Column 12 Line 5, please delete "at lease" and insert therefor --at-least--.

In Column 12 Line 11, after "scheme", please delete "in response to".

In Column 12 Line 30, after "response to", please delete "in response to".

Signed and Sealed this
Twenty-fifth Day of March, 2014

Michelle K. Lee
*Deputy Director of the United States Patent and Trademark Office*